United States Patent [19]
Zaharis

[11] 3,708,904
[45] Jan. 9, 1973

[54] FISHING LINE DIVING DEVICE

[76] Inventor: Edmond P. Zaharis, 5735 N.E. 33rd Avenue, Portland, Oreg. 97211

[22] Filed: Feb. 10, 1971

[21] Appl. No.: 114,176

[52] U.S. Cl. ............... 43/43.13, 43/42.23, 43/42.49
[51] Int. Cl. ............................................. A01k 85/00
[58] Field of Search....43/43.13, 42.04, 42.05, 42.22, 43/42.23, 42.49, 43.14, 42.39

[56] References Cited

UNITED STATES PATENTS

| | | | |
|---|---|---|---|
| 2,220,302 | 11/1940 | Thorne | 43/43.13 |
| 2,952,937 | 9/1960 | Wassing | 43/44.9 |
| 2,235,868 | 3/1941 | Coolidge | 43/43.13 |
| 3,466,787 | 9/1969 | Collins | 43/43.13 |

FOREIGN PATENTS OR APPLICATIONS

| 66,758 | 9/1943 | Norway | 43/43.13 |
|---|---|---|---|

*Primary Examiner*—Warner H. Camp
*Attorney*—Kolisch & Hartwell

[57] ABSTRACT

A fishing line diving device wherein the points of action (or force transmission) of a connected fishing line end, and of a weight included in the device, are infinitely adjustable.

13 Claims, 6 Drawing Figures

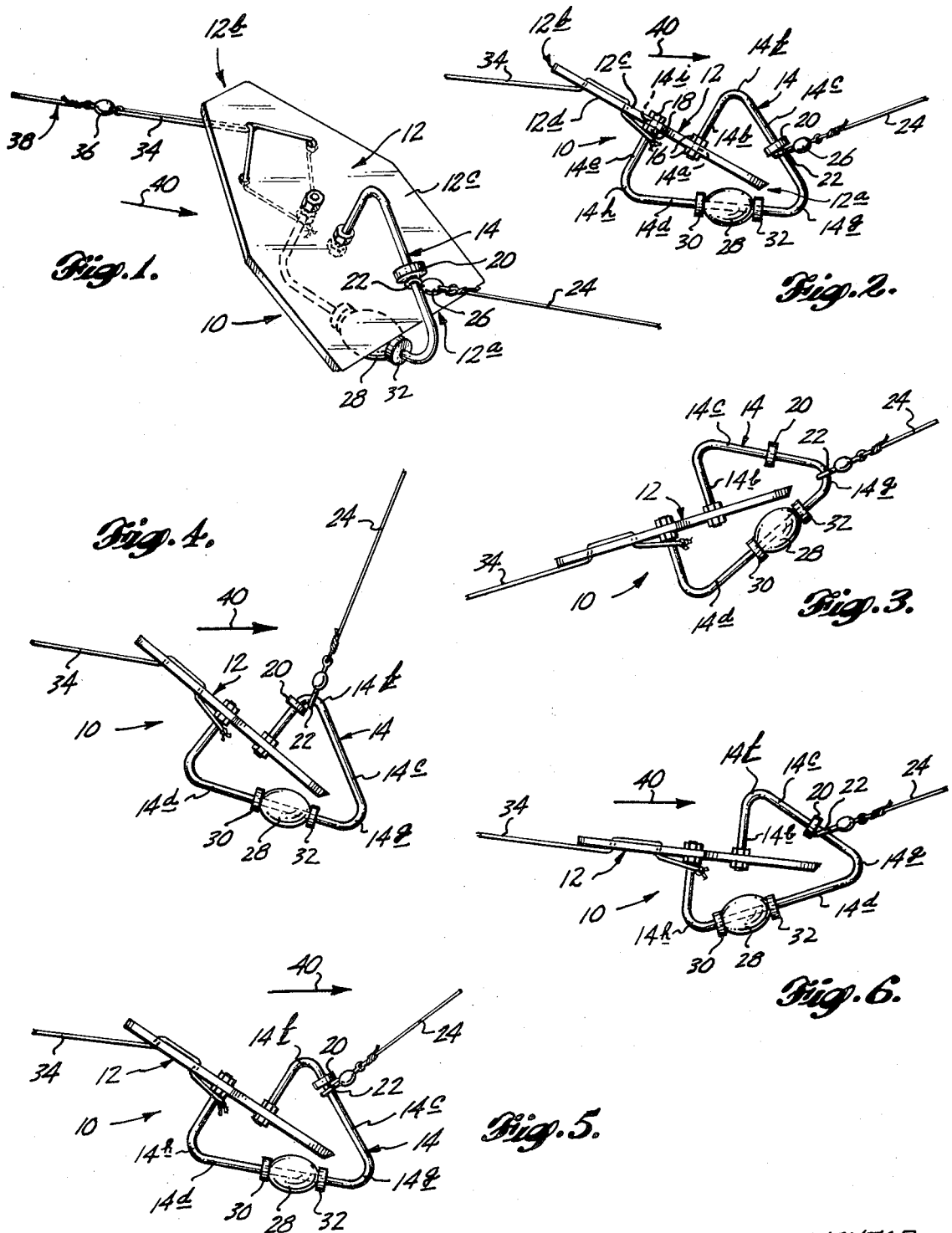

FISHING LINE DIVING DEVICE

BACKGROUND AND SUMMARY OF THE INVENTION

This invention pertains to a fishing line diving device. More particularly, it pertains to such a device wherein the points of action, or of force transmission, of a connected end of a fishing line, and of a movable weight incorporated in the device, can be adjusted to an infinite number of different positions to vary the performance of the device.

As is familar to many people, when trolling for fish, it is necessary to employ some means adjacent the lure or bait to keep it at the proper depth in the water. Most commonly used in the past have been weights which are attached to the outer end of a fishing line near the lure or bait. Generally speaking, the higher the trolling speed, the greater the amount of weight that is required to maintain the line or bait at a particular fishing depth.

Using such weights, however, is not entirely satisfactory for a number of reasons. One of these reasons is that the operation of attaching, removing and changing weights can be quite tedious and time-consuming. Another reason is that available weights do not permit infinitely variable increases or decreases in the total amount of weight used. In other words, there are a limited number of predetermined sizes of fishing weights available on the market, and when these are used, infinite adjustment of the amount of weight employed is simply not attainable. A further drawback with using such weights is that their performance, when submerged in and moving through the water, is unchangeable. They continually add a relatively heavy pull or drag on a line. When a fish is hooked, the fisherman must not only contend with the fighting of the fish, but must also contend with the dead weight (due to the weights) on the line, and this situation can make playing and reeling in of a fish difficult.

In order to overcome some of the disadvantages of using weights, various diving devices have been proposed in the past which may be attached to a line and which cause the outer end of the line (and hence the lure or bait) to dive to a particular depth. These devices, typically, assume one attitude in the water during normal trolling, which attitude tends to hold the outer end of a fishing line down in the water. Through a tug on the line, or on a fish striking the lure or bait, the devices normally assume another attitude wherein they tend to climb out of the water--exerting minimal drag on a line.

A general object of the present invention is to provide a novel fishing line diving device which not only is capable of performing in the manner just outlined above for conventional diving devices, but further is capable of adjustment to an infinite variety of different configurations to permit subtle changes in its performance characteristics.

More specifically, an object of the invention is to provide a diving device wherein the points of action, or force transmission to the device, of a connected fishing line end, and of a movable weight employed in the device, are infinitely adjustable.

A further object of the invention is to provide a device of the type indicated which is simple in construction and easy to adjust to different performance configurations.

According to a preferred embodiment of the invention, the proposed diving device comprises an elongated, flat blade to which is attached an elongated bent bar. One elongated portion of the bar accommodates the free and slidable attachment thereto of an end of a fishing line, and another elongated portion of the bar supports a movable weight. The bar occupies a plane extending generally longitudinally of the blade and substantially normal to the plane of the blade. The line-end supporting portion of the bar extends at an acute angle to the blade's top face--diverging from the blade to the blade's top face--diverging from the blade progressing rearwardly therealong. Adjacent the lead end of the blade, this portion joins through a bend in the bar with the weight-supporting portion. The latter-mentioned portion is disposed at an acute angle to the blade's bottom face, and diverges therefrom progressing rearwardly along the blade.

Slidably mounted on the line-end supporting portion of the bar, and frictionally engaging the same, according to the invention is a slider constituting a first adjustable stop means. This slider takes the form generally of a washer, and can be moved to an infinite number of different fixed positions along the line-end supporting portion of the bar. When the diving device is attached to an end of a fishing line, this slider is disposed toward the trailing end of the blade from the fishing line. Through adjustment of the position of the slider, the diving angle or attitude attainable in the device can be adjusted to suit different trolling speeds and conditions.

Also included in the diving device according to the invention is a second adjustable stop means for retaining the weight in the device in an infinite number of different fixed positions along the weight-supporting portion of the bar. This stop means takes the form of a pair of washer-like sliders disposed on opposite sides of the weight, and slidably mounted on and frictionally engaging the weight-supporting portion of the bar. Through adjustment of the positions of these sliders, the weight can be adjusted forwardly and rearwardly in the device to facilitate still further control over the device's diving performance.

DESCRIPTION OF THE DRAWINGS

These and other objects and advantages attained by the invention will become more fully apparent as the description which follows is read in conjunction with the accompany drawings, wherein:

FIG. 1 is a front perspective view illustrating a fishing line diving device constructed according to the invention, with the device shown in one of many underwater diving attitudes that it is capable of assuming;

FIG. 2 is a reduced-scale side elevation of the near side of the diving device of FIG. 1;

FIG. 3 is a view similar to FIG. 2, but illustrating the device of FIGS. 1 and 2 in a climbing rather than a diving attitude; and FIGS. 4, 5, and 6 are similar to FIG. 2, except that they show the device adjusted to perform (and performing) in three different underwater diving attitudes which are different from that illustrated in FIG. 2.

DETAILED DESCRIPTION OF THE INVENTION

Turning now to the drawings, and referring first to FIGS. 1 and 2, indicated generally at 10 is a diving device constructed according to the invention. Device 10 includes a substantially planar blade 12 having lead and trailing ends 12a, 12b, respectively, and top and bottom faces 12c, 12d, respectively. The rear, or trailing portion, of the blade is tapered as indicated, and the lead end, or edge, of the blade is beveled as shown in FIG. 2. Blade 12 preferably is formed of a relatively lightweight and stiff corrosion-resistant material, such as the plastic material known as Lucite. If desired, the material forming the blade may be colored for the purpose of attracting fish.

Mounted on blade 12 is an elongated bent bar 14. Bar 14 has a substantially cylindrical outside surface, and preferably is formed from a suitable corrosion-resistant material. In the embodiment illustrated, bar 14 is formed from brass rod-stock which is easily bent to the shape indicated. One end of the bar, indicated at 14a, extends through a suitable accommodating bore in the blade (located along the blade's longitudinal axis), and is fastened to the blade by means of nuts 16 which are tightened against the blade's opposite faces. Progressing along the bar from end 14a it includes four substantially straight portions 14b, 14c, 14d, 14e and three bends 14f, 14g, 14h. Bend 14f joins portions 14b, 14c, bend 14g joins portions 14c, 14d, and bend 14h joins portions 14d, 14e. The various portions of the bar are disposed in a substantially common plane which generally includes the longitudinal axis of blade 12, and which is disposed substantially normal to the plane of the blade. As can be seen, portions 14b, 14e substantially parallel one another and are disposed substantially normal to the top and bottom faces, respectively, of the blade. Portions 14c, 14d are disposed at the acute angles illustrated relative to the top and bottom faces, respectively, of the blade. The other end of the bar, indicated at 14i extends through another suitable accommodating bore in the blade (also along the blade's longitudinal axis), and is secured in place by nuts 18 which are tightened against opposite faces of the blade. It will be noted that ends 14a, 14i are slightly spaced apart along the blade's longitudinal axis. Such construction permits relatively simple mounting of the bar on the blade.

Mounted on bar 14 above the top face of the blade according to the invention is the slider 20 which takes the form of a washer. Slider 20 is formed of a suitable corrosion-resistant material such as nylon, and seats snugly against the outside surface of the bar. With sufficient force applied to the slider, it may be shifted along the bar. Without such force, frictional engagement between the slider and bar keeps the former in place on the latter.

Mounted for free sliding along bar 14, toward the lead end of the blade from slider 20 is a ring 22. Ring 22 accommodates attachment of an end of a fishing line to device 10, and in the embodiment illustrated, is connected to such a line end, shown at 24, through a conventional swivel 26.

Also mounted on bar 14 according to the invention, below the bottom face of the blade are a weight 28 and a pair of sliders 30, 32. In particular, weight 28 and sliders 30, 32 are mounted on portion 14d in the bar. The weight may be formed of any suitable material such as lead, and is provided with a bore that freely receives the bar. The weight can thus readily move along bar portion 14d. Sliders 30, 32 are similar in construction to previously described slider 20. And, like slider 20, they are seated snugly on the bar whereby they remain in fixed positions on the bar unless adjusted with sufficient force to overcome friction between themselves and the bar. These two sliders are disposed immediately adjacent opposite ends of weight 28, and function to retain the weight in a fixed position along bar portion 14d.

The three sliders described herein are referred to also as adjustable stop means.

Attached to the trailing portion of the blade through a conventional leader loop 34 and a swivel 36 (see FIG. 1) are a conventional lure-leader assembly indicated generally at 38. Loop 34 is attached as shown to the trailing portion of the blade.

With the parts in device 10 adjusted as shown in FIGS. 1 and 2, and the device attached as illustrated to line 24, the device causes the outer end of the line to dive when the two are introduced into the water behind a moving boat. In particular, device 10 assumes the diving attitude illustrated in FIGS. 1 and 2, with blade 12 sloping downwardly toward its lead end, and the device pulls the outer end of the line (and any lure) down to a certain depth, depending on boat speed. The greater the boat speed, the greater this depth. Once the device has reached the certain depth mentioned, and with the boat speed remaining substantially constant, the device travels along a substantially level path in the water in the direction of arrow 40 in the figures. Also, its attitude in the water remains essentially the same as when it was diving.

The particular diving attitude thus adopted by the device, and shown in FIGS. 1 and 2, results from the positioning therein of sliders 20, 30, 32 and weight 28. It will be noted that in the particular case being described, slider 20 is positioned forwardly on bar portion 14c, and weight 28 is held forwardly by sliders 30, 32 on bar portion 14d. Ring 22 engages bar portion 14c immediately in front of (and beneath) slider 20. This diving attitude is a relatively small-angle attitude, and is one which might typically be selected for a relatively fast trolling speed.

The device remains in such an attitude until either a fish strikes at the lure, or the fisherman for some reason decides to reel in the line. In the case of a fish striking the lure and becoming hooked, device 10 automatically readjusts to a climbing attitude such as that illustrated in FIG. 3, with ring 22 engaging bar 14 at bend 14g. The same condition can, of course, be produced without any fish being hooked by the fisherman simply jerking on the fishing line before reeling it in. In either case, and as can be seen in FIG. 3, blade 12 in the device assumes an upwardly and forwardly inclined attitude (such as that shown) in the water, wherein it tends to climb out of the water with little resistance. Under these circumstances, the tug which the device produces on the fishing line is greatly reduced. And this situation, of course, greatly eases reeling in of the line under all circumstances.

FIGS. 4, 5, and 6 herein illustrate how the device may readily be adjusted to provide a variety of diving characteristics. For example, in FIG. 4, sliders 30, 32 and weight 28 are in the same positions as in FIG. 2, but slider 20 has been shifted rearwardly along bar portion 14c, just past bend 14f. Under these circumstances, ring 22, during normal trolling, engages the bar at bend 14f, with the device then assuming a relatively large-angle diving attitude. This is desirable in situations where a relatively slow trolling speed is contemplated. In other words, a large-angle diving attitude like that shown in FIG. 4 results in the device being able to pull a line end down to a particular depth, and hold it at that depth, at a slower trolling speed than is required in the case of a smaller-angle diving attitude. Looked at from another way, for a given trolling speed, the larger the angle of the diving attitude, the deeper the device pulls and holds the end of a line.

As in the case previously described, a sudden jerk either on the fishing line or on the lure will cause the device to assume a climbing attitude such as that illustrated in FIG. 3.

In FIG. 5, the weight and sliders 30, 32 in the device are in the same positions as in FIGS. 2 and 4, but slider 20 is disposed intermediate the positions shown for it in FIGS. 2 and 4. More specifically, the slider is disposed toward the rear end of bar portion 14c, just in front of bend 14f. This position for slider 20, during trolling, results in a diving attitude in the device which is steeper (i.e., larger in angle) than that illustrated in FIG. 2, but not as steep as that illustrated in FIG. 4.

It will thus be apparent that without changing the position of weight 28 in the device, and simply by changing the position of slider 20, the device can be adjusted to perform (under water) with an infinite number of different diving attitudes to suit different conditions. A fisherman can therefore easily select the particular diving performance that he desires.

According to the invention, yet another adjustment can be made in the configuration of device 10 to permit still further adjustment in the way that it performs. More specifically, and through adjusting the positions of sliders 30, 32, weight 28 can be adjusted to an infinite number of different positions along bar portion 14d. Generally speaking, and for a given position of slider 20 along bar portion 14c, the closer the weight is to the forward end of bar portion 14d, the steeper the diving attitude is that the device assumes under water. In addition, the position of weight 28 on bar portion 14d affects the strength of the jerk required to shift the device from a diving to a climbing attitude. The closer the weight is to the forward end of bar portion 14d, the stronger is the jerk that is required to shift the device into a climbing attitude.

Referring to FIG. 6, slider 20 has the same position along bar portion 14c as it does in FIG. 2. However, sliders 30, 32 and weight 28 have been shifted to positions adjacent the rear end of bar portion 14d. And, it will be noted that a somewhat shallower diving attitude than that illustrated in FIG. 2 results in the device.

The diving device disclosed herein thus readily takes care of the problems mentioned earlier attendant with using conventional weights on a fishing line. In particular, and through accommodating changing its configuration (by adjusting the positions of sliders 20, 30, 32 and weight 28), the device can readily be adjusted to provide an infinite number of different diving characteristics.

While a preferred embodiment of the invention has been described herein, it is appreciated that variations and modifications may be made without departing from its spirit.

It is claimed and desired to secure by letters patent:

1. A diving device for a fishing line, capable of assuming an infinite number of selected diving attitudes when connected to such a line, said device comprising
    an elongated blade,
    an elongated bar portion joined to said blade and extending generally longitudinally thereof adjacent one face of the blade, said bar portion accommodating attachment thereto, for free sliding movement therealong, of an end of a fishing line, and
    adjustable stop means mounted on said bar portion and adjustable to an infinite number of different selected fixed positions therealong to limit sliding movement of such a line end.

2. The diving device of claim 1, wherein said adjustable stop means comprises a slider frictionally and slidably engaging said bar portion.

3. The diving device of claim 2, wherein said bar portion has a substantially cylindrical outside surface, and said slider comprises a washer seated snugly against said surface.

4. The diving device of claim 2, wherein said blade has lead and trailing ends, and with an end of a fishing line attached to said bar portion, said slider is disposed toward the trailing end of the blade from such an end.

5. The diving device of claim 4, wherein said bar portion is disposed at an acute angle to said blade's said one face, with the bar portion diverging from said one face progressing rearwardly along the blade.

6. A diving device for a fishing line, capable of assuming an infinite number of selected diving attitudes when connected to such a line, said device comprising
    an elongated blade having lead and trailing ends,
    an elongated bar portion joined to said blade and extending generally longitudinally thereof adjacent one face of the blade,
    line-attaching means mounted on said bar portion for free sliding therealong, said line attaching means being adapted to be fastened to an end of a fishing line, and
    adjustable stop means mounted on said bar portion toward the trailing end of said blade from said line-attaching means, adjustable to an infinite number of different selected fixed positions along said bar portion to limit sliding therealong of said line-attaching means.

7. The diving device of claim 6, wherein said adjustable stop means comprises a slider frictionally and slidably engaging said bar portion.

8. A diving device for a fishing line, capable of assuming an infinite number of selected diving attitudes when connected to such a line, said device comprising
    an elongated substantially planar blade having lead and trailing ends,
    an elongated bar portion joined to said blade and extending at least partially along and at an acute angle to one face thereof in a plane substantially normal to that of the blade, said bar portion diverging from said one face progressing rearwardly along the blade,
    line-attaching means mounted on said bar portion for free sliding therealong, said line-attaching means being adapted to be fastened to an end of a fishing line, and adjustable stop means mounted on said bar portion toward the trailing end of said blade from said line-attaching means, adjustable to an infinite number of different selected fixed positions along said bar portion to limit sliding therealong of said line-attaching means.

9. A diving device for a fishing line, capable of assuming an infinite number of selected diving attitudes when connected to such a line, said device comprising an elongated blade having lead and trailing ends and top and bottom faces, first and second elongated bar portions joined to said blade and extending generally longitudinally thereof adjacent its said top and bottom faces, respectively, line-attaching means adapted to be connected to an end of a fishing line mounted for free sliding along said first bar portion, first adjustable stop means mounted on said first bar portion toward the trailing end of said blade from said line-attaching means, adjustable to an infinite number of different selected fixed positions along said first bar portion to limit sliding therealong of said line-attaching means, weight means mounted on and adjustable to an infinite number of different selected fixed positions along said second bar portion, and second adjustable stop means mounted on said second bar portion adjustable to an infinite number of different selected fixed positions on the latter for retaining said weight means in different fixed positions on the second bar portion.

10. The diving device of claim 9, wherein said first and second bar portions are disposed in a plane which is substantially normal to the plane of the blade, with said bar portions diverging from the top and bottom faces of the blade progressing rearwardly along the latter.

11. The diving device of claim 10, wherein said first and second bar portions comprise portions of an elongated unitary bar, and join with one another adjacent the lead end of the blade through a bent portion in the bar which curves about and is spaced forwardly of said lead end.

12. The diving device of claim 11, wherein said first adjustable stop means comprises a slider frictionally and slidably engaging said first bar portion.

13. The diving device of claim 12, wherein said second adjustable stop means comprises a pair of sliders disposed on opposite sides of said weight means and frictionally and slidably engaging said second bar portion.

* * * * *